United States Patent
Stroud

(10) Patent No.: US 6,208,585 B1
(45) Date of Patent: Mar. 27, 2001

(54) ACOUSTIC LWD TOOL HAVING RECEIVER CALIBRATION CAPABILITIES

(75) Inventor: James W. Stroud, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/105,344

(22) Filed: Jun. 26, 1998

(51) Int. Cl.$^7$ .................................................. G06F 19/00
(52) U.S. Cl. ................. 367/26; 702/14; 367/14
(58) Field of Search ............. 702/6, 1; 367/22, 367/26, 25, 14

(56) References Cited

U.S. PATENT DOCUMENTS

| | | | |
|---|---|---|---|
| 4,809,236 | * | 2/1989 | Hsu et al. ............................... 367/28 |
| 5,197,038 | * | 3/1993 | Chang et al. ........................... 367/28 |
| 5,233,568 | * | 8/1993 | Kan et al. ............................... 367/27 |
| 5,485,431 | * | 1/1996 | Johnson et al. ........................ 367/30 |
| 5,510,582 | * | 4/1996 | Birchak et al. ....................... 181/102 |
| 5,639,997 | * | 6/1997 | Mallett ................................... 181/102 |
| 5,763,773 | * | 6/1998 | Birchak et al. .................... 73/152.58 |
| 5,831,934 | * | 11/1998 | Gill et al. ................................. 367/25 |
| 5,842,149 | * | 11/1998 | Harrell et al. ............................ 702/9 |
| 5,936,913 | * | 10/1999 | Gill et al. ................................. 367/25 |

\* cited by examiner

*Primary Examiner*—Donald E. McElheny, Jr.
*Assistant Examiner*—Victor J. Taylor
(74) *Attorney, Agent, or Firm*—J. M. Gilbreth; Mary A. Gilbreth; Gilbreth & Associates, P.C.

(57) ABSTRACT

A sonic or acoustic tool having a transmitter and a receiver and further having a receiver testing and calibration device is disclosed. Methods for testing and tuning acoustic receivers dynamically are also disclosed. The calibration device includes an acoustic signal generator in acoustic communication with a receiver or a plurality of receivers, where the generator generates an acoustic calibration signal or test signal which propagates to each receiver. The receiver response is monitored to determine receiver integrity and tune. Based on the response, the processing unit or units can adjust the receiver response or instruct tuning circuitry associated with the receiver to adjust the receiver response.

20 Claims, 6 Drawing Sheets

ACOUSTIC LWD TOOL HAVING RECEIVER CALIBRATION CAPABILITIES

BACKGROUND OF THE INVENTION

1. Field of the Invention

The present invention relates to sonic or acoustic tools including a calibration and/or testing device for tuning or calibrating acoustic receivers and associated electronics or testing the stability and integrity of acoustic receivers and associated electronics.

More particularly, the present invention relates to acoustic downhole tools including a transmitter, an isolator, a receiver, associated electronics and a calibration device for dynamic receiver calibration and receiver/electronic integrity and/or stability testing. The present invention also relates to methods of making and methods of using the tool.

2. Description of the Related Art

In general, the apparatus for making an acoustic log consists of a transmitter capable of providing acoustic impulses, and at least one receiver responsive to acoustic energy, both mounted on a support for movement through the length of a well bore. The transmitter and receiver are spaced apart by a fixed distance and as the support is moved through the well bore, the energy from the acoustic pulses periodically generated by the transmitter is picked up by the receiver after transmission through and reflection from the well bore. The amplitudes of the received signals are correlated with the depth in the well bore to provide a log indicating the qualities of the cement bonding to the bore over the length of the well.

The acoustic transmitter and receiver(s) employed for these purposes typically comprise a piezoelectric or magnetostrictive element which converts periodic electric impulses into acoustic waves corresponding to the frequency of the periodic electric impulses and having an amplitude generally proportional to the energy of the electric impulses. The receiver, on the other hand, receives acoustic waves impinging thereon converting the pressure waves into an electric signal generally proportional to the intensity of the acoustic wave energy or amplitude. Thus, the receiver and transmitters work essentially in the opposite format.

For effective operation of these components, it is necessary that they both be efficiently coupled to the surrounding media and at the same time carefully protected or insulated from deleterious effects of liquids and gases present in well bores or casing. As the tool move through the well bore, the tools will encounter numerous changes in heat and pressure and spurious acoustic and vibrational disturbances which can result in tool malfunctions or calibration drifts.

One major drawback to present acoustic or sonic tools is the lack of ability to calibrate or even test the receivers and associated electronics for integrity or stability during down hole operations. Numerous U.S. Patents disclose acoustic or sonic LWD tools including, for example, U.S. Pat. Nos. 3,213,415, 4,809,236, 5,197,038 and 5,485,431, but none address real time calibration and integrity testing of the receiver portion of the tool.

Therefore, there is a need in the art for improved sonic tools having receiver testing and calibration capabilities. Moreover, there is a need in the art for improved sonic tools allowing dynamic testing and/or tuning of the receivers incorporated in the tools. Furthermore, there is a need in the art for methods of testing receiver responses or to tune or calibrate the receivers during routine operation.

SUMMARY OF THE INVENTION

The present invention provides a sonic tool including a transmitter, an isolator, a receiver, associated electronics and a novel calibration device operatively associated (in acoustic communication) with the receiver(s) designed to dynamically test the stability and integrity of the receiver(s) or to dynamically calibrate or tune the receiver(s).

The present invention also provides a receiver unit including a receiver and a novel calibration device operatively associated (in acoustic communication) with the receiver where the calibration device is designed to dynamically test the stability and integrity of the receiver or to dynamically calibrate or tune the receiver. The receiver unit can include a plurality of receivers each in acoustic communication with a calibration device.

The present invention further provides a calibration device generally including an acoustic transmission medium in acoustic communication with a receiver and an acoustic signal generator operatively coupled to the medium. When an acoustic signal is generated by the generator, it propagates through the medium to the receiver resulting in a receiver response which can be used to dynamically calibrate or tune the receiver, or dynamically test receiver stability and/or integrity.

The present invention provides a method for dynamically calibrating or testing a receiver unit of a sonic tool. The method includes generating an acoustic signal in an acoustic transmission medium in acoustic communication with the receiver and monitoring a response of the receiver to the generated acoustic signal. The method can further include calibrating the receiver unit based on its response to the acoustic calibration signal.

The present invention also provides a method for making a sonic tool including an internal calibration unit associated therewith. The method includes contacting a receiver unit of a sonic tool with an acoustic signal transmission medium in contact with an acoustic calibration signal generator capable of generating an acoustic signal.

BRIEF DESCRIPTION OF THE DRAWINGS

These and other needs in the art and aspects of the present invention will be set forth in greater detail herein and, in particular, in reference to the illustrative drawings described below where like elements may have common labels:

FIG. 5A is a schematic view through a second embodiment of a calibration unit 500 showing an acoustic signal generator 512, a reservoir 516, a receiver unit 526 having a cavity 524, a conduit 510 connecting the reservoir 516 to the cavity and a bias member 502.

DETAILED DESCRIPTION OF THE INVENTION

Figure 1:
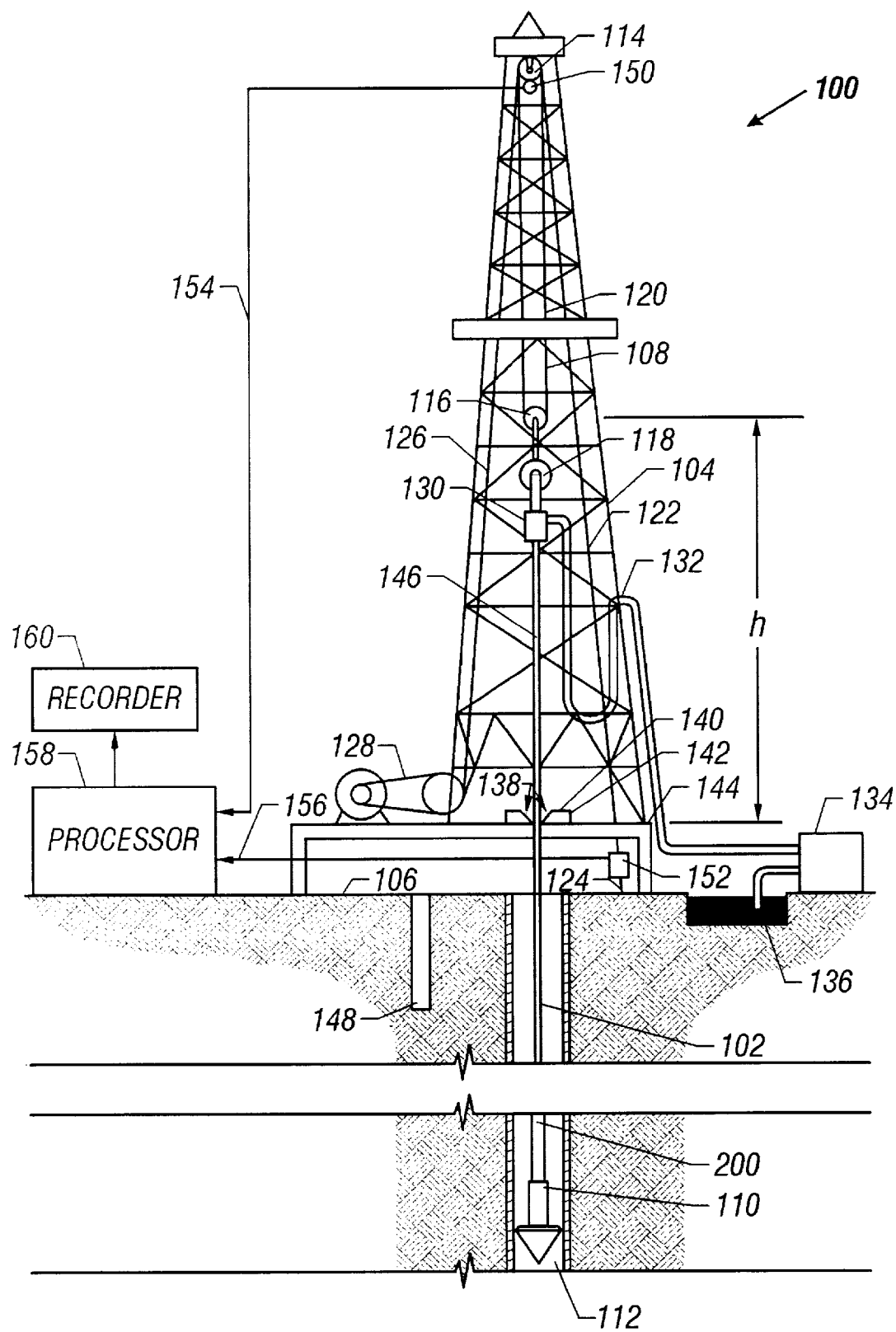
FIG. 1 is a schematic illustration of a drilling rig 100 and a drill string 102 with a downhole acoustic logging tool 200 of the present invention.

The inventor has found that sonic or acoustic tools for using downhole can be constructed with a calibration/test device that is capable of testing, monitoring, adjusting, tuning and/or calibrating the response of a receiver of a sonic tool such as an LWD or other down hole tool. Previous sonic tools were not designed to test the stability or the integrity of the receiver of such tools or to allow adjustment, tuning or calibration of the receiver during operation.

The tools of the present invention include at least one transmitter, an isolator, at least one receiver, associated electronics and a novel calibration device operatively associated with the receiver(s). The calibration unit can be used either to dynamically calibrate or tune the receiver or to test the stability and integrity of the receiver or a combination thereof. The calibration device generally includes an acoustic transmission medium in acoustic communication with the receiver(s) and a signal generator operatively coupled to the medium for generating an acoustic signal in the medium. The generated signal results in a receiver response when detected by each receiver. The response can be used to dynamically test the receiver stability and/or integrity or to tune or calibrate each receiver by activating a calibration or tuning device or circuit associated with each receiver.

The present invention is also directed to a method for dynamically testing a receiver unit of a sonic tool. The method includes generating a calibration signal in a medium in operative contact or acoustic communication with a receiver of an acoustic tool and monitoring a response of the receiver to the calibration signal. The method can further include calibrating the receiver based on its response to the generated signal.

The present invention is further directed to a method for performing well logging including placing the tool in a pressurized (about 300 psi) casing filled with water. The pressurized casing is suspended inside a larger casing. The larger casing is also filled with water. The tool is turned on and the transmitter fires generating acoustic energy which is transmitted through the water and is coupled to the pressurized casing, which has an attenuation rate of about 0.2 dB per foot. The acoustic energy travels down the casing and is coupled to each of the tool receivers producing a corresponding response, which is collected by the tool-processor and forwarded to the surface possessor.

Next or periodically, the tool transmitter is disabled by the signal processor and the signal generator of the calibration device is powered on or activated. Of course, the tool can have a signal processor that works in conjunction with a surface processing unit; although the calibration can also be handled exclusively by a land based processing unit. The calibration signal generator produces a sinusoidal (periodic signal) pressure waves or acoustic signal. The pressure waves (signal) travel through the silicon oil (the transmission medium) filling the reservoir and conduits to each of the receiver at their given depth locations along the length of the tool. When the pressure waves strike a receiver, preferably piezoelectric transducers, the receiver produces an electric voltage in response. The voltage is measured by the signal processor and the waveforms from each receiver are sent to the surface computer for analysis.

Periodically, during normal logging service, the tool-processor collects calibration data and sends the calibration data to the surface computer. The calibration data can be used to determine a receiver response history or to dynamically tune or calibrate a receiver's response based on the calibration data by activating tuning circuitry associated with the receivers.

Preferably, to calibrate the receivers, the receiver gain at each depth location (each receiver location) is adjusted by the signal processor such that the amplitude of the received signal is corrected for the 0.2dB per foot attenuation of the calibration signal based on the separation between the generator and the given receiver. Thus, a multi-receiver sonic tool can be dynamically and periodically calibrated during operation, by periodically, firing the calibration generator analyzing the response and adjusting the receiver gain if the signal from a given receiver is below or above the response gain the give receiver should have recorded based on the distance between the generator and the receiver and on the 0.2 dB/ft casing attenuation rate.

The present invention is yet further directed to a method for making a sonic tool including an internal calibration unit associated therewith. The method includes contacting a receiver unit of a sonic tool with an acoustic signal transmission medium in contact with an acoustic signal generator capable of generating a calibration signal.

Because the receiver unit is designed to detect acoustic signal or periodic pressure waves propagating through a transmission medium, the signal generator of the present invention is generally a device capable of generating a repeatable pressure wave or a repeatable periodic or semi-periodic pressure wave or acoustic signal. Of course, the frequency of the generated signal must be within an acoustic detection range for the receiver. Preferably, the pressure wave is of a known frequency and amplitude so that information about the receiver's stability, integrity, calibration and tuning can be determined from an analysis of the receiver's response to the generated signal. The generator can also be designed to generate a set of acoustic signals having different frequencies and/or amplitudes throughout the receiver's complete range of detectable frequencies and amplitudes to test for receiver drift or drift in the acoustic transmitters or excitation source.

Acoustic signal generators suitable for use in the calibration unit of the present invention includes, without limitation, condensed microphones, transducers, piezoelectric transducers, mechanical compression devices, or the like, or combination thereof. The preferred signal generator is a piezoelectric transducer. The frequency range for the transmitters and receivers are typically between about 500 Hz to about 25,000 Hz (25 kiloHz). Of course, higher and/or lower frequencies can be used provided that the transmitter(s) and the calibration generator(s) are capable of generating the frequencies and the receivers are capable of detecting the frequencies.

The calibration signal generator should be capable of producing a signal at a frequency in this range or at a set of frequencies in this range. Additionally, the generator could generate a plurality of single frequencies according to some sequence or pattern, i.e., the generator will generate a frequency $v_1$ at a calibration sequence time $c_1$, a frequency $v_2$ at a calibration sequence time $c_2$, etc, a frequency $v_n$ at a calibration sequence time $c_n$ and back to the frequency $v_1$ at the calibration sequence time $c_1$ to restart the sequence. The sequence of frequencies can either be patterned (i.e., according to some fixed repeating pattern) or the sequence can be randomly generated by a random number generator or some fluctuating physical measurement (such as a quantum pressure device) where each randomly selected frequency value would be transmitted to the surface processor. Of course, the random frequencies would be selected in the frequency range of the receiver.

Suitable signal transmission media, include, without limitation, organic and inorganic fluids such as natural or synthetic oils, mineral oils, motor oils, silicones fluids, non-two phase mixtures or combinations thereof, or the like. Silicon oils are preferred. Less preferred signal transmission media include, without limitation, gases such as air, nitrogen, argon, neon, helium, or mixtures thereof. Suitable solid signal transmission media include, without limitation, metals, ceramics or any material with phonon resonances in the frequency range of the receiver.

Suitable calibration or tuning circuits to be used with the present receivers include, without limitation, gain adjusting circuitry that can be correct the gain of the receiver based on the response to the calibration signal and the distance between the receiver and the generator as is well-known in the art, frequency adjusting circuitry that can adjust the receivers frequency response range as is well-known in the art, or any other circuitry or combination of circuitry known in the art for tuning acoustic receivers or adjusting a receivers response to a given signal. Of course, regardless of the type of circuitry employed, the circuitry would have to be controlled by either the on-tool or surfaces processor.

Alternatively, the processing unit can simply correct a receivers response based on the calibration information collected during the logging survey. Under this scenario, the tool and the receivers do not require circuitry that can be used to dynamically adjust receiver response characteristics during logging. The calibration information would be used to correct for receiver gain drift or response drift. Under this scenario, patterned signal profiles may be preferred to a single frequency so that the processor has sufficient calibration information to correct receiver response data (gain v. frequency) for the entire frequency range of the receivers.

Referring now to FIG. 1, there is shown a general illustration of a drilling rig 100 and a drill string 102 with a down hole acoustic or sonic tool 200 of the present invention. The rotary drilling rig 100 shown generally includes a mast 104 rising above a ground surface 106 which is fitted with a lifting gear 108 from which is suspended the drill string 102 formed of drill pipes screwed one to another and having at its lower end a drill bit 110 for the purpose of drilling a well 112. The lifting gear 108 consists of a crown block 114, an axis of which is fixed to the top of the mast 104, a vertically traveling block 116, to which is attached a hook 118, a cable 120 passing round blocks 114 and 116 and forming, from the crown block 114, on one hand a dead line 122 anchored to a fixed point 124 and on the other an active line 126 which winds around a drum of a winch 128.

The drill string 102 is suspended from the hook 118 by means of a swivel 130 linked by a hose 132 to a mud pump 134, which permits the injection of drilling mud into well 112, via the hollow pipes of the drill string 102. Drilling mud may be drawn from a mud pit 136 which may be fed with surplus mud from the well 112. The drill string 102 may be elevated by turning the lifting gear 108 with the winch 128 and the drill pipes may be successively removed from (or added to) the drill string 102 and unscrewed in order to remove the bit 110. These drill pipe raising and lowering operations require the drill string 102 to be temporarily unhooked from the lifting gear 108; the former is then supported by blocking it with wedges 138 in a conical recess 140 in a rotating table 142 mounted on a platform 144 through which the drill string 102 passes. The lowermost portion of the drill string 102 may contain one or more tools, such as the acoustic tool 200 for investigating downhole drilling conditions or for investigating the properties of the geological formations penetrated by the bit and the borehole 112.

During drilling operations, the drill string 102 is driven in a rotary motion by means of a kelly 146 fitted to its upper end. Between such periods the kelly 146 is stored in a pipe sleeve 148 in the ground.

Variations in the height h of the traveling block 116 during these the drill string 102 raising operations are measured by means of a sensor 150 which may be an angle of rotation sensor coupled to the faster pulley of crown block 114. A weight F applied to the hook 118 of the traveling block 116 may also be measured by means of a strain gauge 152 inserted into the dead line 122 of the cable 120 to measure its tension. The sensors 150 and 152 are connected by lines 154 and 156 to a processing unit 158 which processes the measurement signals and which incorporates a clock. A recorder 160 is connected to the processing unit 158, which is preferably a computer.

Figure 2:
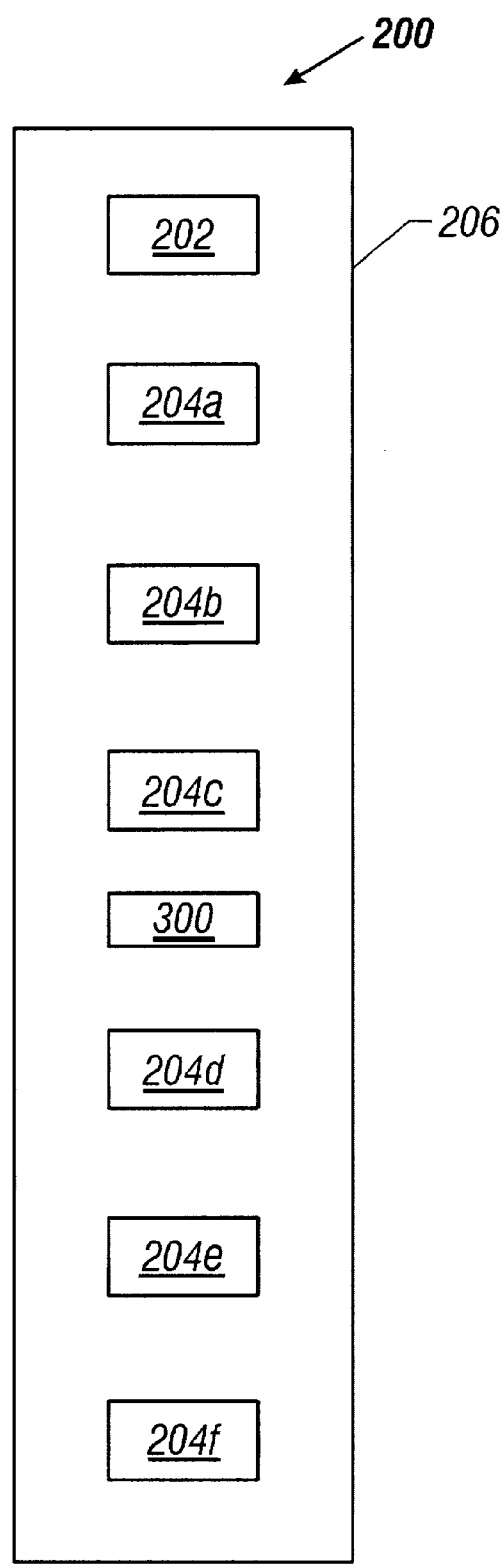
FIG. 2 is a side view of the present invention showing the sonic tool 200, a transmitter 202, a receiver 204, and a calibration device 300.

Referring now to FIG. 2, there is shown one embodiment of sonic well tool 200 of the present invention, showing a transmitter 202, a receiver 204, an isolator 206 and a calibration device 300. As shown the tool 200 includes not one receiver, but a plurality of receivers 204a–f. Although the tool 200 is shown with six receivers, the tools of the present invention can incorporate from 1 to any number of receivers limited only by available space on the tool and the size of the receivers. Ideally, when multiple receivers are used a distance between the receivers is set to a given distance or set of distances. When multiple receivers are incorporated into the tool, each receive can have associated therewith its own calibration unit, or the calibration device can comprise one calibration device placed either above the receiver 204a or below the receiver 204f in acoustic communication with each of the receivers 204a–f or the calibration device can comprise of one centralized calibration device in acoustic communication with each receiver as shown in FIG. 2.

Figure 3:
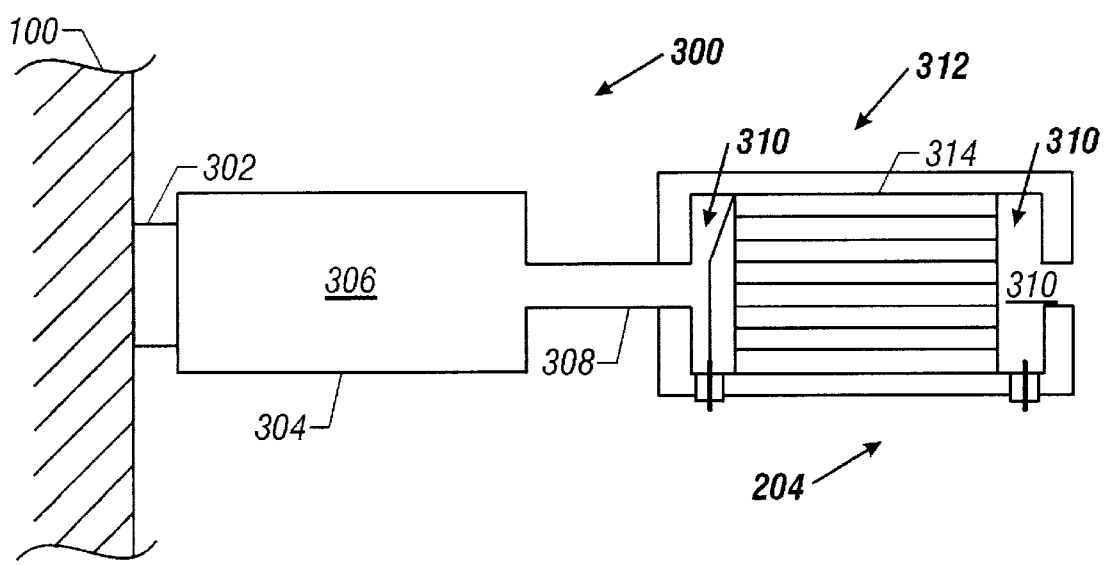
FIG. 3 is a cross-sectional schematic view through a first embodiment of a calibration unit 300 showing an acoustic signal generator 302, a reservoir 304 filled with an acoustic medium 306, having a conduit 308 connecting the reservoir 304 to a cavity 310 associated with the receiver 204.

Referring now to FIG. 3, there is shown a calibration device 300 including a generator 302 operatively attached to a reservoir 304 containing an acoustic transmission fluid 306 and a conduit 308 connecting the reservoir 304 with a fluid cavity 310 of a receiver 204. When the generator 302 generates an acoustic calibration signal, it propagates through the reservoir 304, through the conduit 308 and into the cavity 310 where it is received by the receiver 204 producing a receiver response. The receiver response can then be analyzed by the signal processing unit 158. Of course, the receiver 204 is coupled to the drilling mud through receiver window 312 where a signal produced by the transmitter 202 is received after being reflected from the well 112 or the geological structures through which the well 112 passes.

Additionally, the receiver 204 can have a tuning circuit 314 for tuning the receiver 204 dynamically as a result of the response generated by the receiver 204 upon detection of the calibration signal. The configuration of FIG. 3 can be used for each receiver in a multiple receiver tool or each receiver can have its own calibration device. If each receiver has a different response curve to sound, then it maybe preferable to have a single calibration device associated with all receiver so that each receiver can be tested and tuned from a single calibration device.

Figure 4:
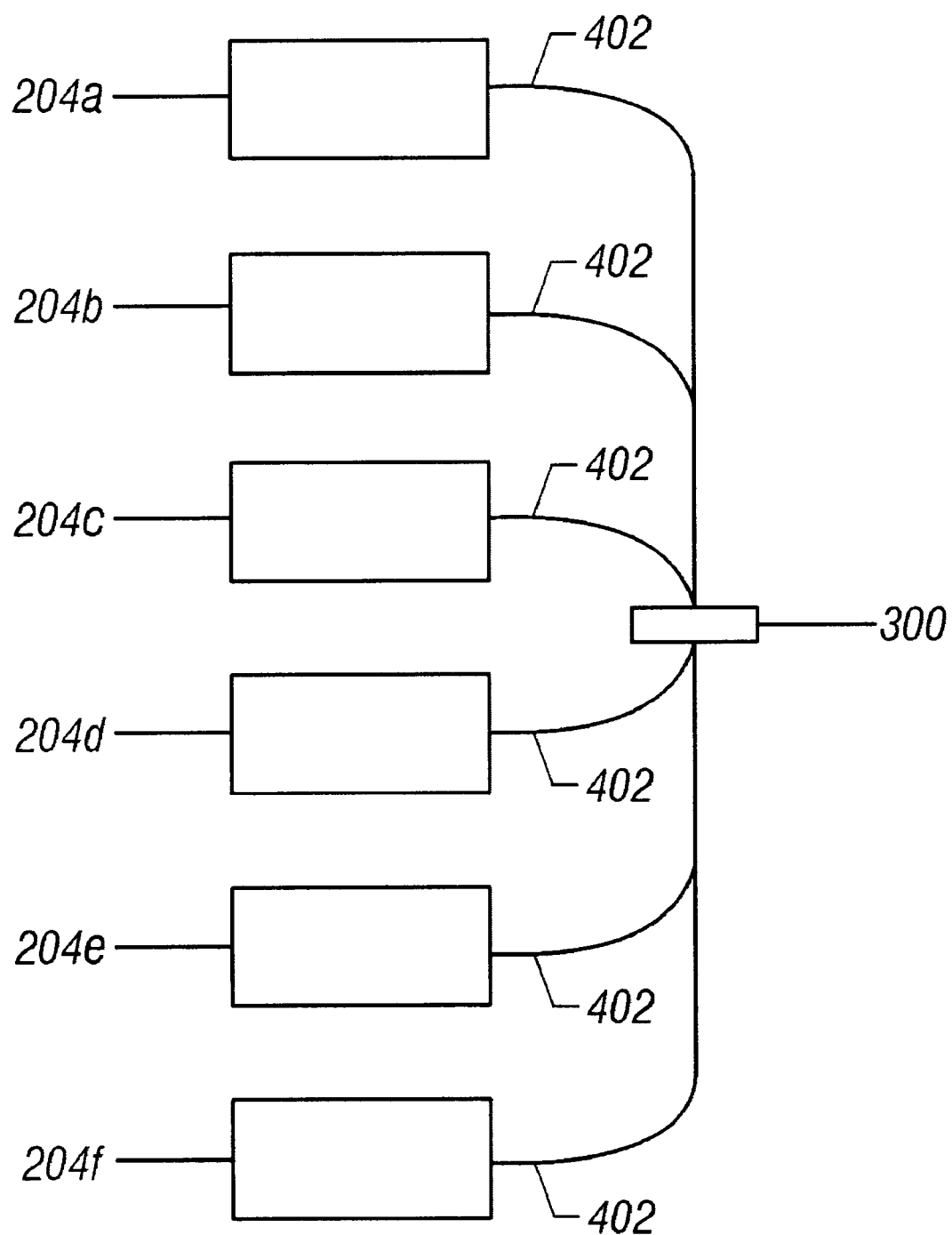
FIG. 4 is a schematic view through a portion of an acoustic tool 400 having a plurality of receivers 402 and a calibration unit 300 of FIG. 3 in acoustic communication with the receivers 402.

A single calibration unit can be used in multiple receiver tools as shown in FIG. 4 where a single calibration unit 300 is shown in acoustic communication with a plurality of receivers 204a–f. The calibration unit 300 is as set forth in FIG. 3 except that the unit also includes a plurality of conduits 402 each leading to one of the receivers 204a–f. Preferably, the calibration unit 300 is disposed above the receiver 204a so that travel paths from the reservoir to each receiver are slightly increased, causing the arrival of the acoustic energy to be slightly delayed in time as the energy passes down to the receiver 204f.

Figure 5:
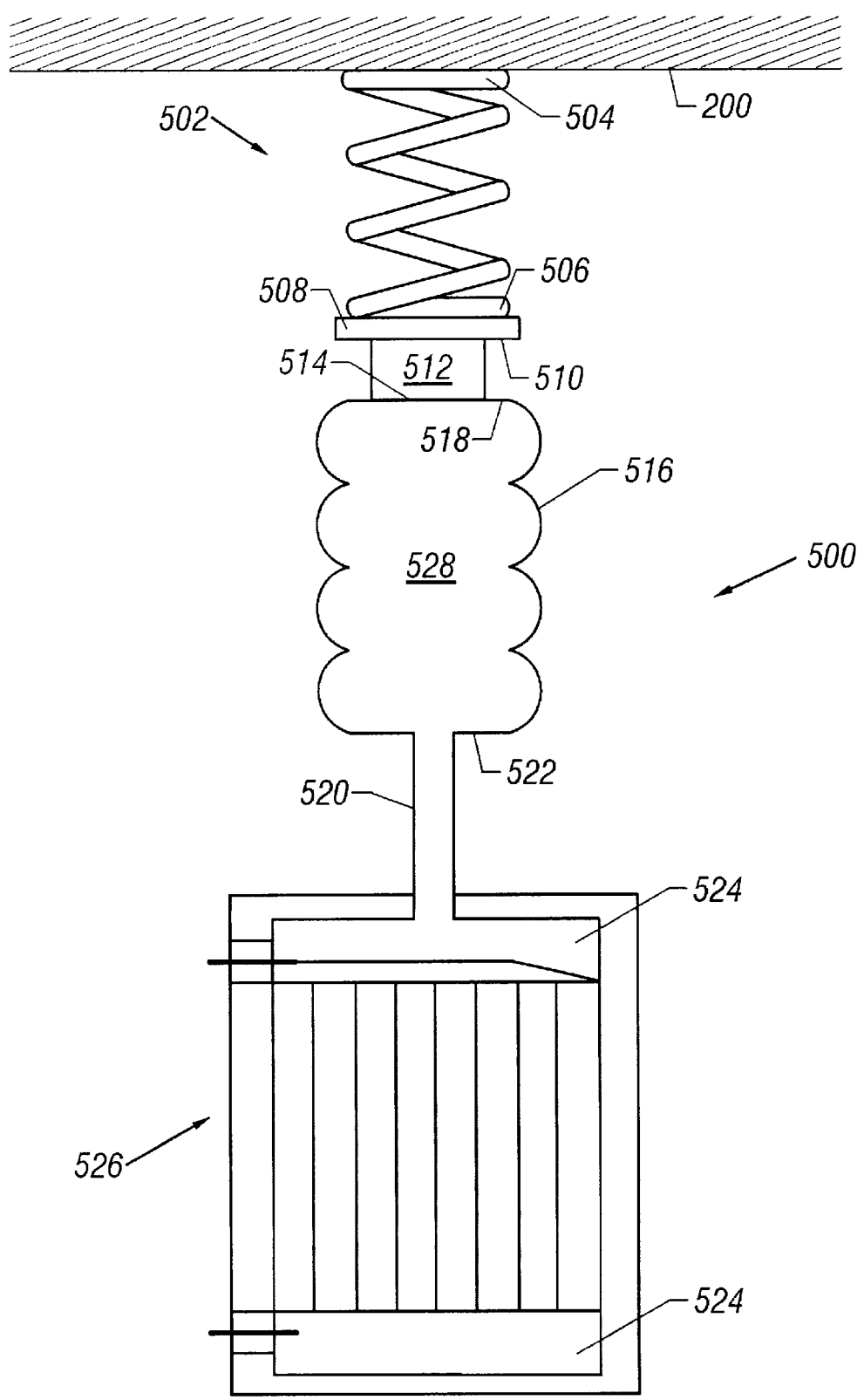
FIG. 5 is a schematic view through a second embodiment of a calibration unit 500 showing an acoustic signal generator 512, a reservoir 516, a receiver unit 526 having a cavity 524, a conduit 510 connecting the reservoir 516 to the cavity and a bias member 502.

Referring now to FIG. 5, there is shown another embodiment of the calibration device of the present invention generally 500. The device 500 includes a bais member 502, preferably a mechanical spring, fixedly attached to the tool 200 at its proximal end 504 and at its distal end 506 to a stop 508. Generally, the spring is a stiff spring capable of exerting a force on the string stop of about 15 psi. The bias member 502 ensures that the generator 512 maintains good acoustic communication with the reservoir 516. Attached to an opposite side 510 of the stop 508 is acoustic signal generator 512, preferably a piezoelectric transducer. The generator 512 is attached at its other side 514 to an adjustable reservoir 516 at its first end 518. A conduit 520 extends from a second end 522 of the reservoir 516 to a calibration cavity 524 of a receiver 526. The reservoir 516, the conduit 520 and the calibration cavity 524 are filled with an acoustic transmission fluid 528. The reservoir 516 is adjustable to compensate for changes in volume of the fluid 528 due to a change in temperature and/or pressure during operation. One preferred adjustable reservoir 516 is a bellows as shown in FIG. 5.

However, as shown in FIG. 5a the adjustable reservoir 516 could also be a cylinder/piston assembly, where a fixed end 532 of a piston 534 is attached to the spring stop 508 and the generator 512 is attached to an interior surface 536 of the piston 534 as shown in FIG. 5A. The piston 534 slidingly engages an interior surface 538 of a cylindrical reservoir 540.

Figure 6:
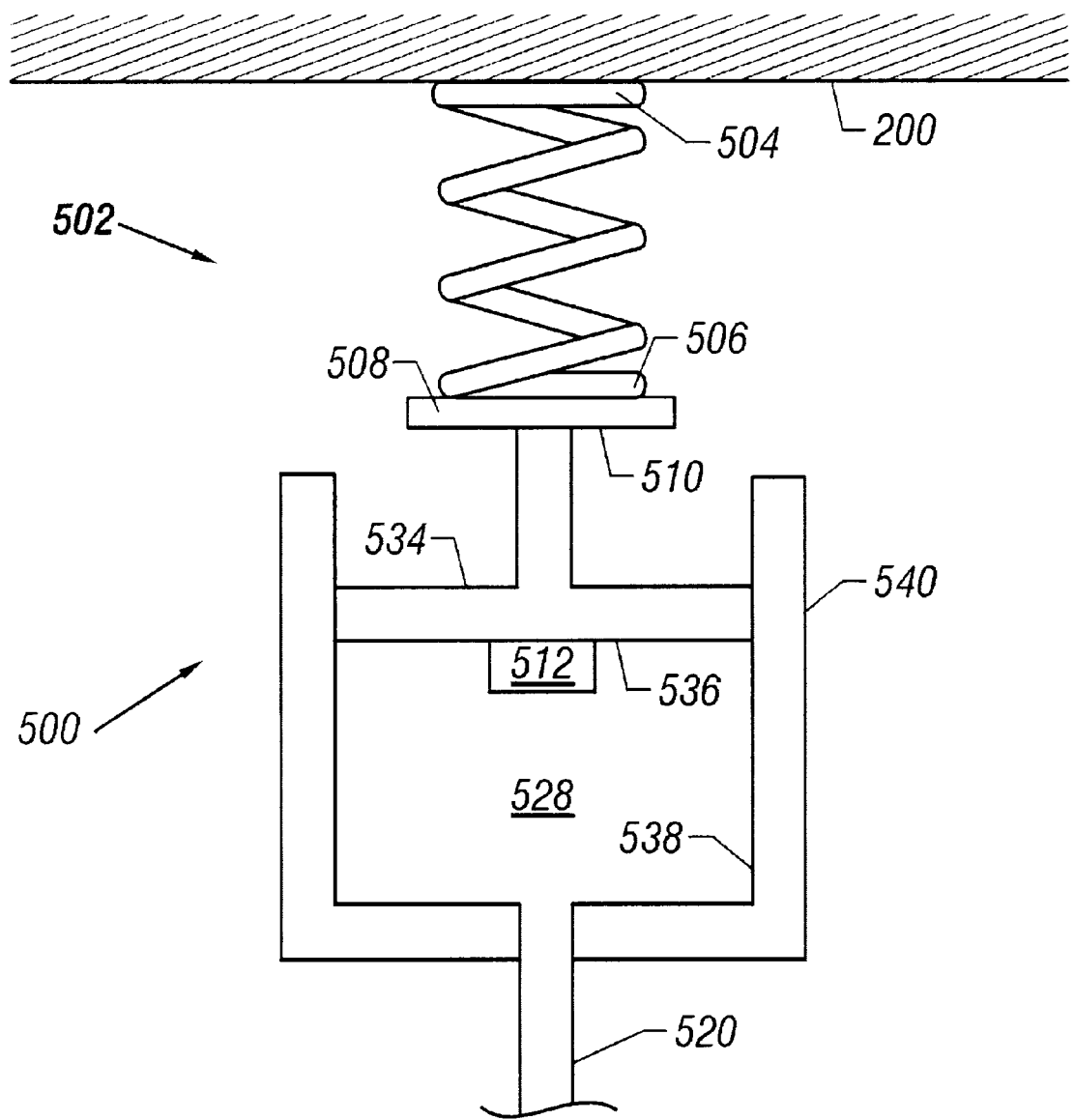
FIG. 6 is a flow chart 600 representing one embodiment of the method of the present invention.

Referring now to FIG. 6 there is shown flow chart 600. Block 610 relates to placing a sonic logging tool in a well where the sonic tool comprises an acoustic transmitter, a receiver unit, an isolator interposed between the transmitter and the receiver for isolating the transmitter and the receiver, and a signal processing unit in electrical communication with the receiver for analyzing a receiver response to the transmitter or the generator. The receiver unit may include a receiver and a signal generator, wherein the signal generator is in acoustic communication with the receiver for transmitting a calibration signal to the receiver. Block 620 of flow chart 600 relates to periodically firing the transmitter to generate a well logging acoustic signal. Block 630 of flow chart 600 relates to detecting the well logging signal at the receiver and transmitting the results to the processor unit. Block 640 of flow chart 600 relates to periodically generating a test signal by the generator. Block 650 of flow chart 600 relates to receiving the test signal and transmitting the results to the processor unit.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

I claim:

1. A down hole tool receiver device comprising:
   (a) a receiver and
   (b) a signal generator in acoustic communication with the receiver for transmitting a calibration signal to the receiver during real-time operation of the device while the device is positioned in a well bore.

2. The device of claim 1, further comprising:
   (c) a reservoir attached to the generator;
   (e) a bias member securing the generator to a sonic tool housing and placing a force against the generator to maintain sufficient acoustic contact between the generator and the reservoir;
   (f) a conduit extending from the reservoir to a fluid cavity of the receiver; and
   (g) an acoustic transmission medium filling the cavity, the conduit and reservoir.

3. The receiver of claim 1, wherein the transmission medium is a natural or synthetic oil or combination thereof.

4. The receiver of claim 1, wherein the transmission medium is a mineral oil, motor oil, silicones fluid or oil, or combination thereof.

5. The receiver of claim 1, wherein the transmission medium is silicones fluid or oil.

6. The receiver of claim 1, wherein the reservoir is adjustable to changes in fluid volume due to changes in temperature or pressure.

7. The receiver of claim 1, wherein the generator is a piezoelectric transducer.

8. A sonic tool comprising:
   (a) an acoustic transmitter;
   (b) a receiver device comprising:
      (i) a receiver and
      (ii) a signal generator in acoustic communication with the receiver for transmitting a calibration signal to the receiver during real-time operation of the device while the device is positioned in a well bore; and
   (c) an isolator interposed between the transmitter and the receiver for isolating the transmitter and the receiver.

9. The tool of claim 8, further comprising:
   (d) a signal processing unit in electrical communication with the receiver for analyzing a receiver response to the transmitter or the generator.

10. The tool of claim 8, wherein the receiver device further comprises:
   (iii) a reservoir attached to the generator;
   (iv) a bias member securing the generator to a sonic tool housing and placing a force against the generator to maintain sufficient acoustic contact between the generator and the reservoir;
   (v) a conduit extending from the reservoir to a fluid cavity of the receiver; and
   (vi) an acoustic transmission medium filling the cavity, the conduit and reservoir.

11. The tool of claim 8, wherein the transmission medium is a natural or synthetic oil or combination thereof.

12. The tool of claim 8, wherein the transmission medium is a mineral oil, motor oil, silicones fluid or oil, or combination thereof.

13. The tool of claim 12, wherein the transmission medium is silicones fluid or oil.

14. The tool of claim 8, wherein the reservoir is adjustable.

15. The tool of claim 8, wherein the generator is a piezoelectric transducer.

16. The tool of claim 8 wherein the receiver device further comprises a plurality of spaced apart receivers and a plurality of conduits extending from the reservoir to each receiver.

17. A method comprising the steps of:
  (a) placing a sonic logging tool in a well wherein the sonic tool comprises:
    (i) an acoustic transmitter;
    (ii) a receiver device comprising:
      (1) a receiver and
      (2) a signal generator in acoustic communication with the receiver for transmitting a calibration signal to the receiver during real-time operation of the device while the device is positioned in a well bore; and
    (iii) an isolator interposed between the transmitter and the receiver for isolating the transmitter and the receiver; and
    (iv) a signal processing unit in electrical communication with the receiver for analyzing a receiver response to the transmitter or the generator.

18. The method of claim 17, wherein the receiver device further comprises:
  (3) a calibration device for tuning the receiver;
  (4) a reservoir attached to the generator;
  (5) a bias member securing the generator to a sonic tool housing and placing a force against the generator to maintain sufficient acoustic contact between the generator and the reservoir;
  (6) a conduit extending from the reservoir to a fluid cavity of the receiver; and
  (7) an acoustic transmission medium filling the cavity, the conduit and reservoir.

19. The method of claim 18 further comprising the steps of:
  (b) periodically firing the transmitter to generate a well logging acoustic signal;
  detecting the well logging signal at the receiver and transmitting the results to a processor unit;
  periodically generating a test signal by the generator;
  (e) receiving the test signal and transmitting the results to the processor unit; and
  (f) calibrating the receiver based on the response of the receiver to the calibration signal.

20. The method of claim 19, wherein the receiver device further comprises a plurality of spaced apart receivers and a plurality of conduits extending from the reservoir to each receiver.

* * * * *